J. Rand,
Converting Motion.
N° 44,014.   Patented Aug. 30, 1864.
Fig; 1.
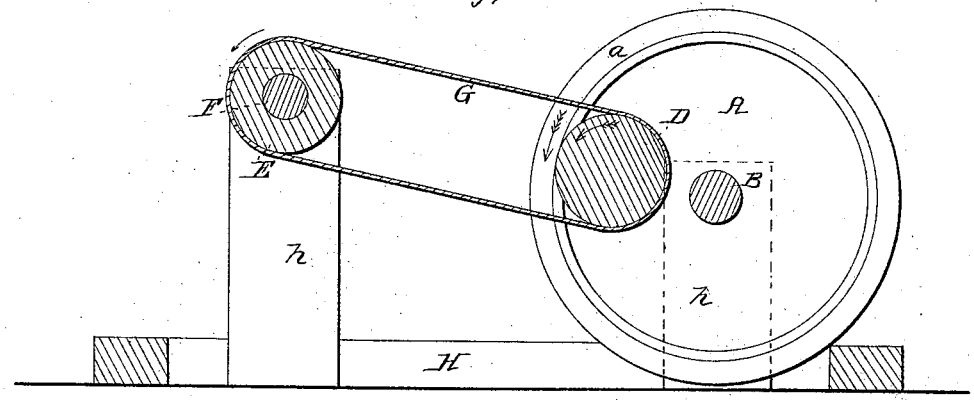
Fig; 2.
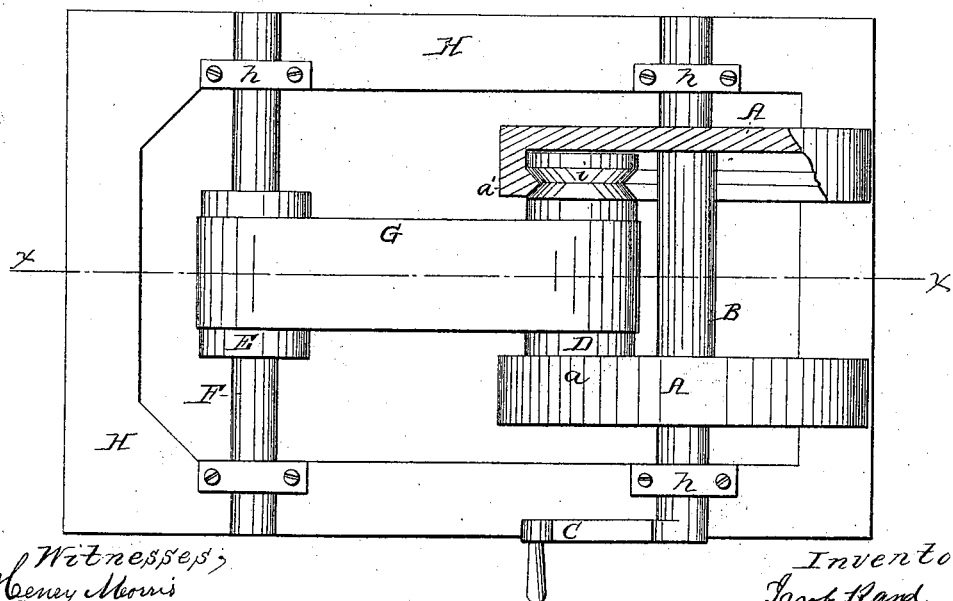
Witnesses;
Henry Morris
James P. Hall
Inventor;
Jacob Rand
per Munn & Co
Attorney

UNITED STATES PATENT OFFICE.

JACOB RAND, OF ROXBURY, MASSACHUSETTS.

IMPROVED MODE OF TRANSMITTING MOTION BY BELTS.

Specification forming part of Letters Patent No. 44,014, dated August 30, 1864.

*To all whom it may concern:*

Be it known that I, JACOB RAND, of Roxbury, in the county of Norfolk and State of Massachusetts, have invented a new and Improved Mode of Running Belts for Transmitting Power; and I do hereby declare that the following is a full, clear, and exact description thereof, reference being had to the accompanying drawings, making a part of this specification, and to the letters of reference marked thereon, like letters in the different figures denoting like parts.

The nature of my invention consists in suspending one or more belt-pulleys between and on the inner surfaces of two rims, which project from the side faces of a pair of driving-wheels on a single shaft, the motion of the driving-wheels being communicated to the pulleys by the friction of said surfaces in contact with the suspended pulleys; also, in providing one or more grooves in each end of the suspended pulleys and corresponding ribs or guides on the inner surfaces of the rims for the purpose of holding the pulley in its proper position and of increasing the friction between the rims and pulleys, and also in such an arrangement that when the work which is being done is increased the tightness of the belt is also increased by slightly increasing the distance between the belt carrying pulleys, as will be hereinafter more fully described.

To enable others skilled in the art to make and use my invention, I will proceed to describe its construction and operation.

In the accompanying drawings, Figure 1 is a vertical longitudinal section through the line $x\ x$, Fig. 2. Fig. 2 is a top plan with one of the driving-wheels shown in section.

A A in Fig. 2 are the driving-wheels, which are carried by the shaft B and crank C. D is the frictional pulley suspended by the rims $a\ a'$ of the driving-wheels A A. The faces of the wheels A A may also be supplied with more than one pair of rims $a\ a'$, and these rims may be arranged one within the other upon the faces of the wheels A A, so that different speeds may be given to the rollers D. E is the opposite pulley keyed to the shaft F, and G is the belt. More than one of the pulleys D may be suspended within a single pair of driving-wheels, A A, so as to drive several belts from the same driving-wheels. H H is the frame-work, $h\ h$ being the pedestals or supports of the shafts. Each end of the pulley D has a V-shaped groove, $i$, Fig. 2, which runs on a corresponding V-projection of rims, as shown by $a'$. This groove and corresponding ridge, besides increasing the friction between the driving-surfaces, keeps the endwise adjustment of the pulley correct, so that its ends cannot come in contact with the faces of the wheels A A and cause a loss of power by friction between the same.

As an increase of work increases the resistance of the shaft F and the belt-pulleys, it requires an increased effort on the part of the frictional grooves and ribs to overcome the said increase of resistance, and, as such increased effort is applied at a right angle to the line of belt, the result is that the pulley D, in finding an equilibrium between the two forces, is carried lower down in the rims $a\ a'$, Fig. 1, wedging it farther from the opposite pulley E, and thereby tightening the belt and increasing its frictional powers for performing the increased duty. By these means shorter belts than are ordinarily employed may be used without danger of slipping, making a saving of material, economizing space, &c.

I claim as new and desire to secure by Letters Patent—

1. The suspending of one or more pulleys D within the rims of the driving-wheels A A substantially in the manner and for the purpose described.

2. The V-shaped frictional groove $i$ and corresponding projection $a'$, for maintaining the proper endwise adjustment of the pulley D, and at the same time increasing the grip of the surfaces, substantially in the manner and for the purpose described.

3. The combination of a movable self-adjusting pulley, D, with the belt G, rock-shaft F, and driving-shaft B, substantially as herein shown and described, so that the belt will be automatically loosened or tightened in proportion to the resistance of the rock-shaft, all as set forth.

JACOB RAND.

Witnesses:
C. H. FISKE,
JOHN W. TITUS.